(12) United States Patent
Hewes et al.

(10) Patent No.: US 11,115,640 B2
(45) Date of Patent: *Sep. 7, 2021

(54) MULTI-SENSOR VIDEO FRAME SYNCHRONIZATION APPARATUS AND METHODS

(71) Applicant: TEXAS INSTRUMENTS INCORPORATED, Dallas, TX (US)

(72) Inventors: Gregory R. Hewes, Dallas, TX (US); Fred W. Ware, Jr., DeSoto, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/201,698

(22) Filed: Nov. 27, 2018

(65) Prior Publication Data

US 2019/0116351 A1 Apr. 18, 2019

Related U.S. Application Data

(60) Continuation of application No. 14/224,793, filed on Mar. 25, 2014, now Pat. No. 10,171,789, which is a division of application No. 12/977,054, filed on Dec. 22, 2010, now Pat. No. 8,717,422.

(51) Int. Cl.
| | |
|---|---|
| *H04N 13/106* | (2018.01) |
| *H04N 13/167* | (2018.01) |
| *H04N 13/243* | (2018.01) |
| *H04N 13/296* | (2018.01) |
| *H04N 13/239* | (2018.01) |

(52) U.S. Cl.
CPC ......... *H04N 13/158* (2018.05); *H04N 13/167* (2018.05); *H04N 13/239* (2018.05); *H04N 13/243* (2018.05); *H04N 13/296* (2018.05)

(58) Field of Classification Search
None
See application file for complete search history.

(56) References Cited

U.S. PATENT DOCUMENTS

| | | |
|---|---|---|
| 6,340,991 B1 | 1/2002 | Chen |
| 6,639,649 B2 | 10/2003 | Fredlund |
| 6,836,288 B1 | 12/2004 | Lewis |
| 7,112,774 B2 | 9/2006 | Baer |
| 7,199,820 B2 | 4/2007 | Oka |
| 8,441,430 B2 | 5/2013 | Lee |
| 8,456,517 B2 | 6/2013 | Spektor |
| 2004/0187044 A1 | 9/2004 | Barman |

(Continued)

*Primary Examiner* — Dakshesh D Parikh
(74) *Attorney, Agent, or Firm* — Brian D. Graham; Charles A. Brill; Frank D. Cimino

(57) ABSTRACT

Apparatus and methods disclosed herein operate to monitor times of receipt of start-of-frame indications associated with frames received from multiple image sensors at a video controller. Time differences between the times of receipt of the frames are calculated. Embodiments herein alter one or more frame period determining parameter values associated with the image sensors if the time differences equal or exceed frame synchronization hysteresis threshold values. Parameter values are adjusted positively and/or negatively to decrease the time differences. The parameter values may be reset at each image sensor when the time differences become less than the frame synchronization hysteresis threshold value as additional frames are received at the video controller.

20 Claims, 4 Drawing Sheets

(56) References Cited

U.S. PATENT DOCUMENTS

| | | | |
|---|---|---|---|
| 2005/0021201 A1* | 1/2005 | Klotz | G01S 13/86 |
| | | | 702/189 |
| 2006/0164534 A1* | 7/2006 | Robinson | H04N 5/232 |
| | | | 348/333.01 |
| 2010/0007717 A1* | 1/2010 | Spektor | G06F 3/017 |
| | | | 348/43 |
| 2010/0110291 A1* | 5/2010 | Owashi | H04N 5/073 |
| | | | 348/529 |
| 2011/0267269 A1* | 11/2011 | Tardif | H04N 21/422 |
| | | | 345/158 |

* cited by examiner

MULTI-SENSOR VIDEO FRAME SYNCHRONIZATION APPARATUS AND METHODS

This application is a continuation of prior application Ser. No. 14/224,793, filed Mar. 25, 2014, which is a divisional of prior application Ser. No. 12/977,054, filed Dec. 22, 2010, now U.S. Pat. No. 8,717,422, granted May 6, 2014.

TECHNICAL FIELD

Embodiments described herein relate to apparatus and methods associated with digital imaging, including structures and methods associated with video frame synchronization.

BACKGROUND INFORMATION

Some methods of stereoscopic image and video capture, sometimes referred to as "three-dimensional" (3-D) imaging, use two or more image sensors to capture a scene. Each image sensor captures the scene from a slightly different angle according to the amount of spacing between the image sensors.

In the case of stereoscopic video, good results may be obtained when the frames captured by each image sensor are synchronized. Lack of synchronization between frames may result in a loss of perceived depth, that is, loss of the 3-D effect. Visual cues may become confused if an object's location is seen as different between the left and right views at the time of capture.

Commercially available image sensors are typically packaged with a sensor controller. Precise timing of integration start and stop times for each pixel and other low-level timing are controlled by the image sensor controller and/or by logic within the image sensor itself. The sensor controller operates as an interface between the image sensor and system control logic such as a system processor. An image sensor controller may receive sensor timing parameter setup instructions from the system control logic and provide status and synchronization signals and information back to the system.

Some stereoscopic imaging systems may use image sensors designed for monocular imaging. Control logic associated with such image sensors may not provide for synchronization of frames from multiple image sensors. The absence of multi-sensor frame synchronization may result in unacceptable stereoscopic video quality as described above.

SUMMARY OF THE INVENTION

Embodiments herein operate to adjust frame lengths of one or more video frames at one or more image sensors in a multi-sensor video capture device. Frame length adjustments are made in order to synchronize integration periods of video frames received from multiple image sensors at a multi-sensor video controller. The video controller receives start-of-frame signals from the image sensors. Time differences between receipt of the start-of-frame signals from different sensors are used to calculate frame period adjustment values. The adjustment values are sent to image sensor controllers associated with the image sensors. The image sensor controllers adjust one or more parameters affecting the period of one or more frames generated at an image sensor associated with each controller. The parameters are adjusted to decrease the time differences between the start-of-frame signals as received at the multi-sensor video controller. Frame integration periods are substantially synchronized at each of the image sensors as a result.

DETAILED DESCRIPTION

Figure 1:
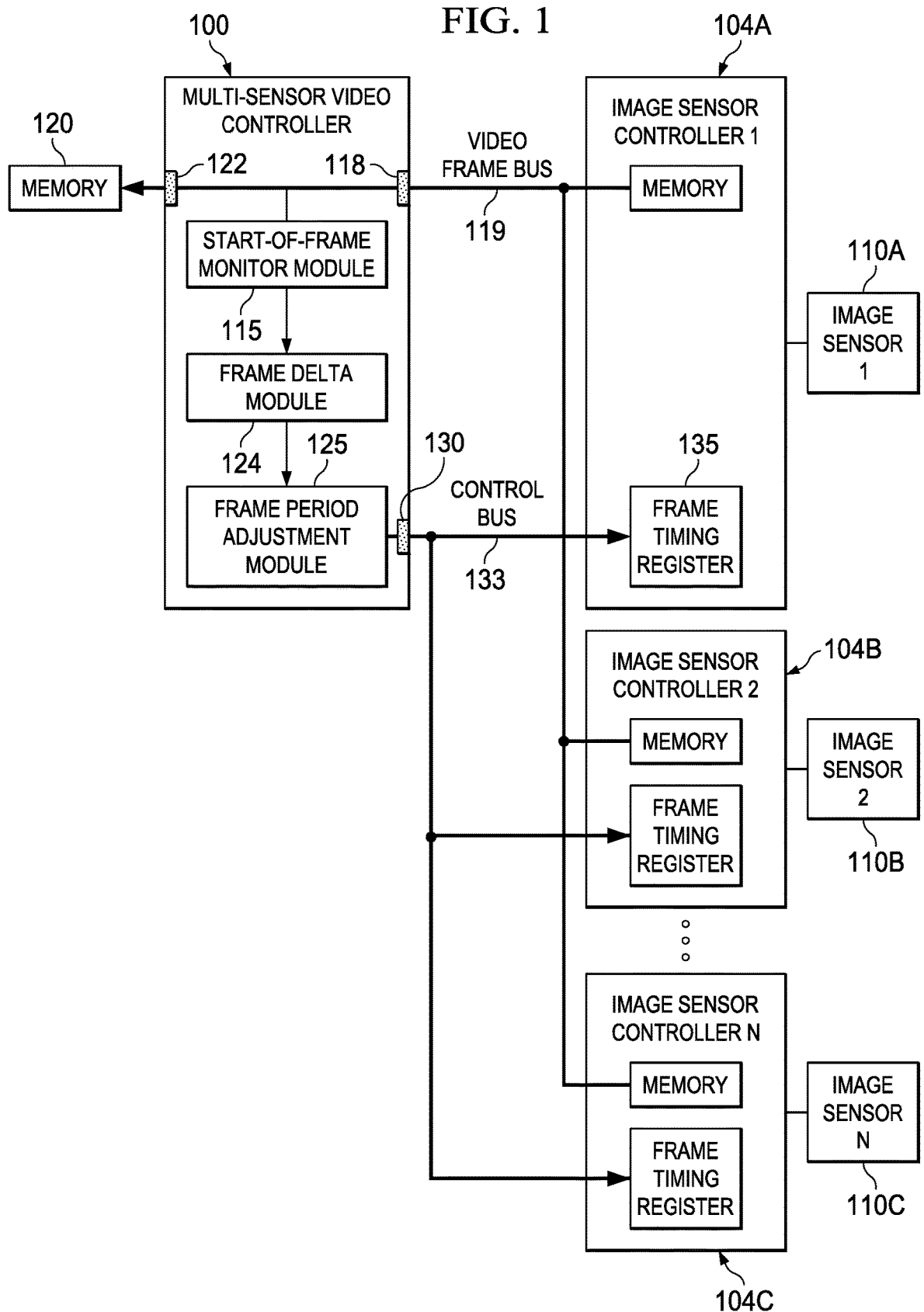
FIG. 1 is a block diagram of a multi-sensor video controller within an imaging system according to various example embodiments of the current invention.

FIG. 1 is a block diagram of a multi-sensor video controller 100 within an imaging system according to various example embodiments of the current invention. The video controller 100 provides image sensor parameter setup information to two or more image sensor controllers 104A, 104B, and 104C (collectively, "image sensor controllers 104"). Each of the image sensor controllers 104 supplies low-level timing and control signals to a corresponding image sensor 110A, 110B, or 110C (collectively, "image sensors 110"). The image sensor controllers 104 also provide a stream of video frames, status, and synchronization signals back to the multi-sensor video controller 100.

The video controller 100 includes a start-of-frame monitor module 115. The start-of-frame monitor module 115 monitors times of receipt of start-of-frame indications associated with frames from each of the image sensors 110. The video controller 100 also includes a video frame bus interface 118 operationally coupled to the start-of-frame monitor module 115. The video frame bus interface 118 receives video frames and start-of-frame indicators associated with the image sensors 110 across a video frame bus 119. The start-of-frame indicators are captured by the start-of-frame monitor module 115. The video frames are passed to a memory 120 via a memory bus interface 122, the latter operationally coupled to the video frame bus interface 118.

Figure 2:
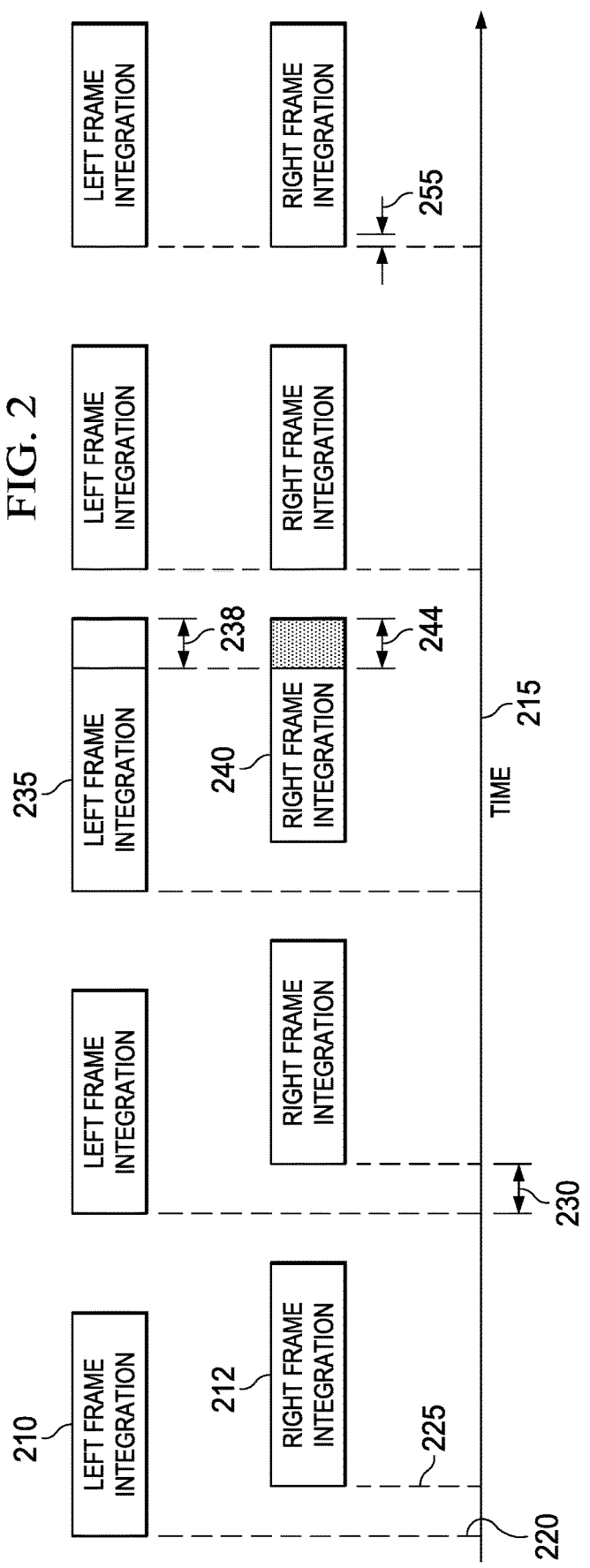
FIG. 2 is a video frame timing diagram according to various example embodiments.

FIG. 2 is a video frame timing diagram according to various example embodiments. FIG. 2 shows example frames originating at two image sensors (e.g., the example frame 210 associated with a left-hand image sensor and the example frame 212 associated with a right-hand image sensor). Frames from the two image sensors are shown distributed along a timeline 215 as received at the start-of-frame monitor module 115 of the video controller 100. The start-of-frame monitor module 115 captures the times of receipt associated with each of the frames (e.g., the times 220 and 225 associated with the receipt of frames 210, 212, respectively).

Turning back to FIG. 1, the video controller 100 also includes a frame delta module 124 coupled to the start-of-frame monitor module 115. The frame delta module 124 calculates the time difference 230 (FIG. 2) between the times of receipt of frames associated with the image sensors 110.

The video controller 100 also includes a frame period adjustment module 125 coupled to the frame delta module 124. A control bus interface 130 is operationally coupled to the frame period adjustment module 125. The frame period adjustment module 125 communicates with the image sensor controllers 104 across a control bus 133. The control bus 133 may be an I2C or other appropriate bus type.

The frame period adjustment module 125 generates control values associated with one or more frame period determining parameters. Frame period determining parameters may include vertical blanking periods, horizontal blanking periods, length and width of active data area, and others. The frame period adjustment module 125 transfers the frame period determining parameter values across the control bus 133 and into timing registers associated with the image sensor controllers 104 (e.g., the frame timing register 135 associated with the image sensor controller 104A).

The image sensor controllers 104 adjust the frame period determining parameters by amounts corresponding to the values loaded into the frame timing registers 135 by the frame period adjustment module 125. If the time difference 230 of FIG. 2 is greater than or equal to a frame synchronization hysteresis threshold value 255, the frame period adjustment module 125 loads one or more adjusted values into the frame timing registers 135.

The adjusted frame period determining parameter values cause the image sensor controllers 104 to modify the length of one or more frames such as to decrease the time difference 230. Frame lengths associated with one or more earlier-arriving frames (e.g., the example frame 235) may be elongated by a period of time 238 corresponding to the time difference 230. In some embodiments, frame lengths associated with one or more later-arriving frames (e.g., the example frame 240) may be shortened by a period of time 244 corresponding to the time difference 230.

The image sensors 110 are substantially synchronized when the time difference 230 becomes less than the frame synchronization hysteresis value 255 as determined by the frame delta module 124. At that point, the frame period adjustment module 125 loads the frame timing registers 135 associated with each of the image sensors 110 to equal values in order to equalize frame lengths of frames subsequently received from each of the image sensors 110.

Figure 3:
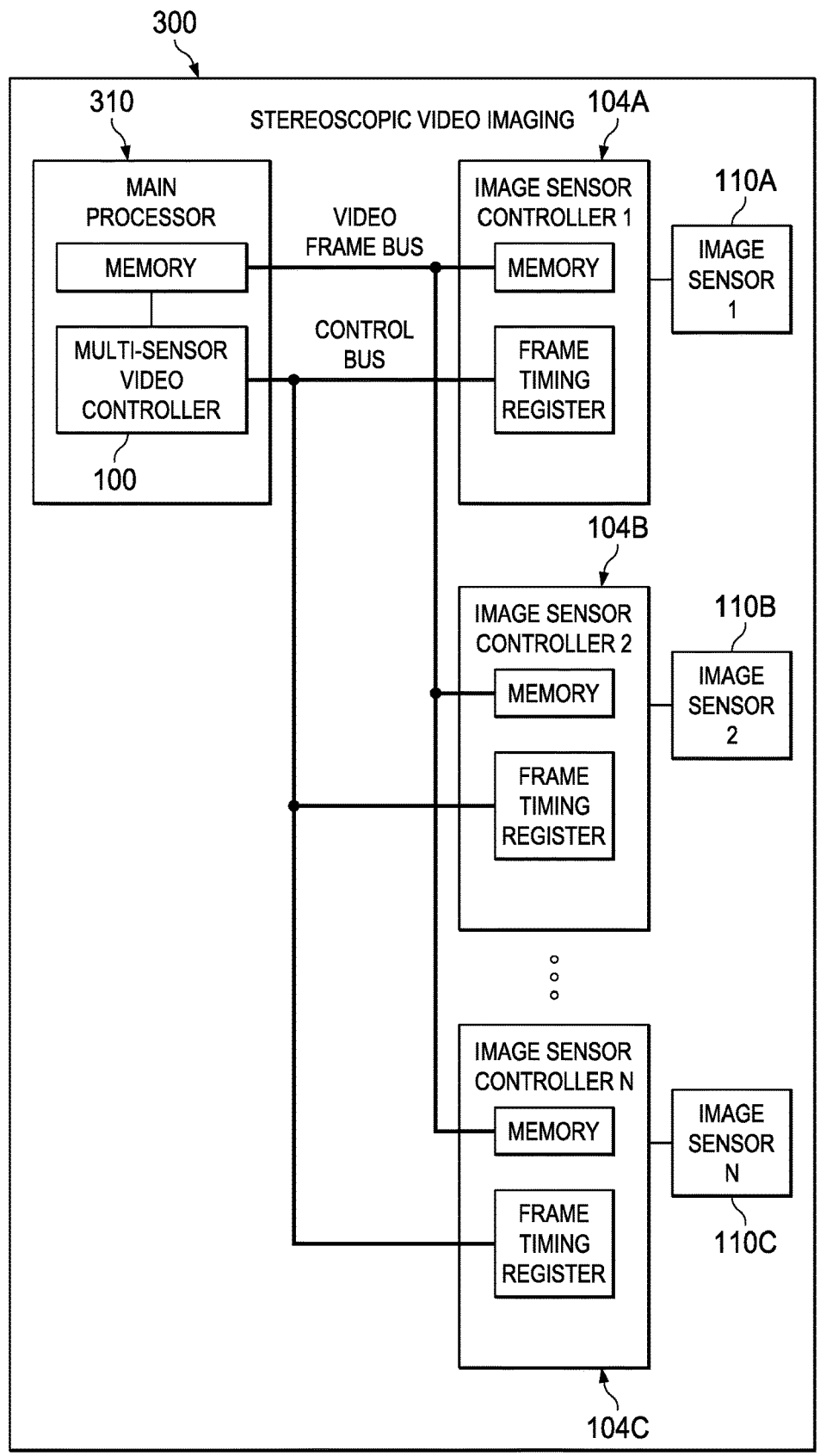
FIG. 3 is a block diagram of a stereoscopic video imaging system according to various example embodiments.

FIG. 3 is a block diagram of a stereoscopic video imaging system 300 according to various example embodiments. The stereoscopic video imaging system 300 includes a main processor 310 and two or more image sensor controllers 104 (e.g., image sensor controllers 104A, 104B, 104C) coupled to the main processor 310. The imaging system 300 also includes a set of image sensors 110 (e.g. 110A, 110B, 110C) each coupled to one of the image sensor controllers 104. The main processor 310 includes the multi-sensor video controller 100 described above. In some embodiments, the video controller 100 may be integrated on the same die as the main processor 110. The stereoscopic video imaging system 300 may be included as one or more components of a smart phone, a video camera, a vehicle, a robotic device, a manufacturing apparatus, an avionic device, an apparatus associated with space exploration, and the like.

The controllers 100, 104A, 104B, 104C; the image sensors 110A, 110B, 110C; the monitor module 115; the bus interfaces 118, 122, 130; the frame bus 119; the memory 120; the frames 210, 212, 235, 240; the timeline 215; the times 220, 225; the frame delta module 124; the time difference 230; the adjustment module 125; the control bus 133; the register 135; the hysteresis threshold value 255; the periods of time 238, 244; the imaging system 300; and the processor 310 may all be characterized as "modules" herein.

The modules may include hardware circuitry, optical components, single or multi-processor circuits, memory circuits, and/or computer instructions encoded in a computer-readable medium and capable of being executed by a processor (excluding non-functional descriptive matter), firmware, and combinations thereof, as desired by the architects of the multi-sensor video controller 100 and the stereoscopic video imaging system 300, and as appropriate for particular implementations of various embodiments.

The apparatus and systems described herein may be useful in applications other than synchronizing video frames in a multi-sensor apparatus. Examples of the multi-sensor video controller 100 and the stereoscopic video imaging system 300 herein are intended to provide a general understanding of the structures of various embodiments. They are not intended to serve as complete descriptions of all the elements and features of apparatus and systems that might make use of these structures.

The various embodiments may be incorporated into electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may also include one or more methods.

Figure 4:
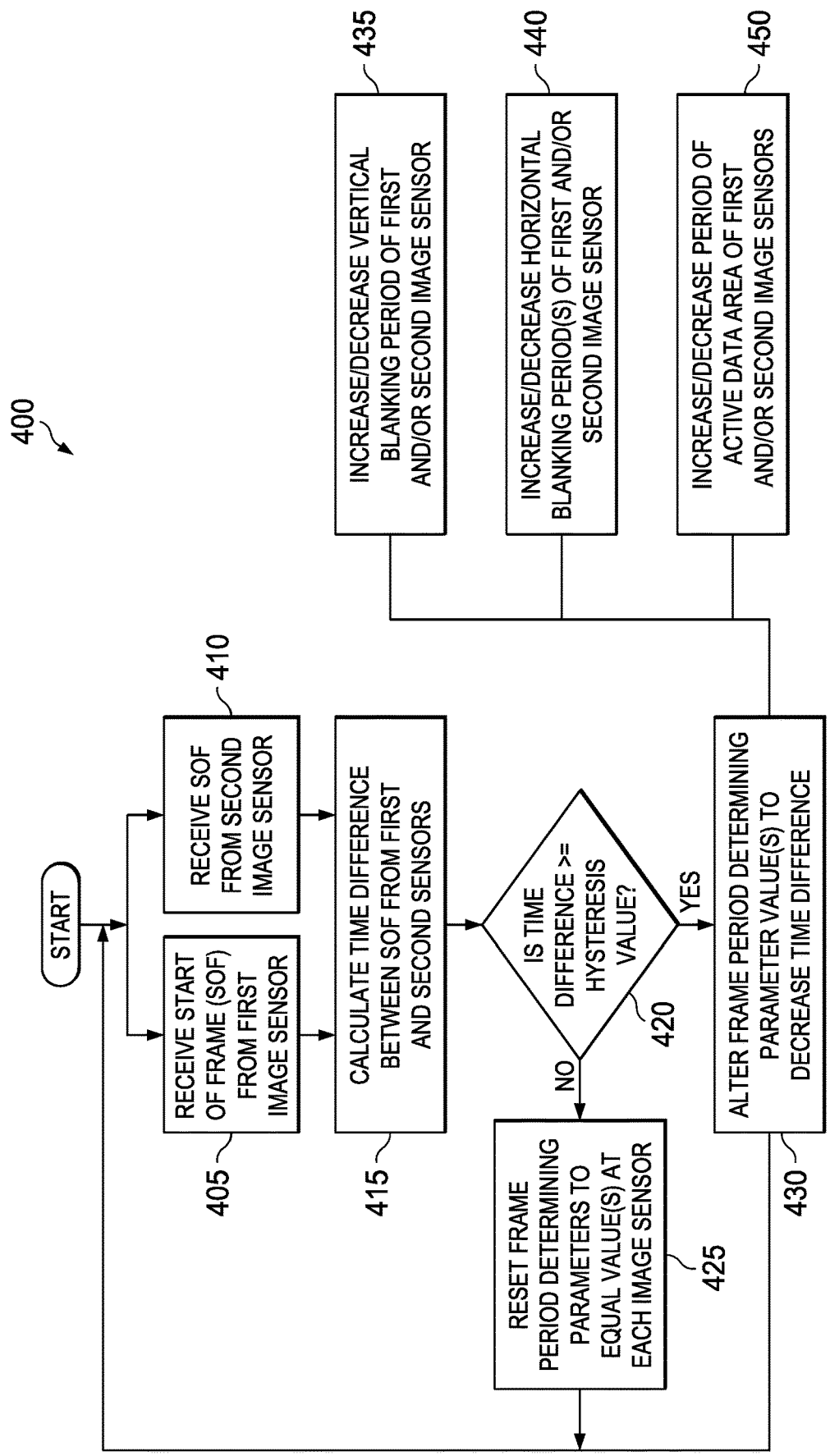
FIG. 4 is a flow diagram illustrating an example method according to various embodiments.

FIG. 4 is a flow diagram illustrating an example method 400. The method 400 performs frame length adjustments to one or more video frames in order to synchronize integration periods associated with frames received from multiple image sensors at a video controller.

The method 400 starts at blocks 405 and 410 with monitoring times of receipt of start-of-frame indications associated with video frames from two or more image sensors at the video controller. The method 400 continues with calculating time differences between the times of receipt of start-of-frame indicators received from each image sensor at the video controller, at block 415.

The method 400 also includes determining whether the time differences are greater than or equal to a frame synchronization hysteresis threshold value, at block 420. If the time differences are less than the frame synchronization hysteresis threshold value, the method 400 further includes setting one or more frame period determining parameter values to be equal for each of the image sensors, at block 425. Some embodiments may load timing registers associated with the image sensors with the parameter values. The timing registers may be loaded by transferring the parameter values from the video controller to the image sensors across a control bus.

As used herein, frame period determining parameters may include vertical and/or horizontal synchronization timing values. For example, horizontal blanking periods, vertical blanking periods, and/or time periods associated with the active data area of a frame may contribute to the length of frames generated at each of the image sensors.

If the time differences are greater than or equal to the frame synchronization hysteresis threshold value, the method 400 continues at block 430 with altering one or more values associated with the frame period determining parameters at one or more of the image sensors. One or more of the values are adjusted positively and/or negatively in order to decrease the start-of-frame time difference to a period less than the frame synchronization hysteresis threshold value as additional frames are received at the video controller from the image sensors.

Thus, the method 400 may include increasing and/or decreasing a vertical blanking period associated with one or more frames generated at the first image sensor, the second image sensor, or both, at block 435. The method 400 may also include increasing and/or decreased a horizontal blanking period, at block 440. That is, inter-row periods may be increased or decreased. In some embodiments, the method 400 may include increasing and/or decreasing a period of an active data area associated with one or more frames from the first image sensor, the second image sensor, or both, at block 450.

It is noted that the activities described herein may be executed in an order other than the order described. The various activities described with respect to the methods identified herein may also be executed in repetitive, serial, and/or parallel fashion. In some embodiments, for example, the method 400 may repeat during video capture to provide for ongoing frame synchronization.

The apparatus and methods described herein operate to perform frame length adjustments in order to synchronize integration periods associated with video frames received from multiple image sensors at a video controller. Superior stereoscopic video imaging may result.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. § 1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A video controller, comprising:
a processor; and
a non-transitory computer readable storage medium storing a program for execution by the processor, the program including instructions to:
receive a first start-of-frame indication that has a first time of receipt and is associated with a first image sensor;
receive a second start-of-frame indication that has a second time of receipt and is associated with a second image sensor;
calculate a time difference between the first time of receipt associated with the first image sensor and the second time of receipt associated with the second image sensor; and
adjust a first frame period determining parameter associated with the first image sensor to:
decrease the time difference between the first time of receipt associated with the first image sensor and the second time of receipt associated with the second image sensor, in response to determining that the time difference between the first time of receipt associated with the first image sensor and the second time of receipt associated with the second image sensor is greater than or equal to a frame synchronization hysteresis threshold value; and
be equal to a second frame period determining parameter of the second image sensor, in response to determining that the time difference between the first time of receipt associated with the first image sensor and the second time of receipt associated with the second image sensor is less than the frame synchronization hysteresis threshold value.

2. The video controller of claim 1, wherein the instructions further comprise instructions to adjust the second frame period determining parameter associated with the second image sensor.

3. The video controller of claim 1, further comprising instructions to adjust a horizontal blanking period of the first image sensor in response to adjusting the first frame period determining parameter of the first image sensor.

4. The video controller of claim 1, further comprising instructions to adjust a vertical blanking period of the first image sensor in response to adjusting the first frame period determining parameter of the first image sensor.

5. The video controller of claim 1, wherein the instructions to adjust the first frame period determining parameter comprise instructions to adjust an active data area of the first image sensor.

6. The video controller of claim 1, further comprising a control bus interface coupled to the processor, the control bus interface configured to transfer a control value associated with the first frame period determining parameter associated with the first image sensor to a first image sensor controller of the first image sensor.

7. The video controller of claim 6, wherein the control bus interface is an inter-integrated circuit (I2C) bus.

8. The video controller of claim 1, further comprising a video frame bus interface coupled to the processor, the video frame bus interface configured to:
receive a first image frame from the first image sensor; and
receive a second image frame from the second image sensor.

9. The video controller of claim 1, wherein the instructions further comprise instructions to:
store a first frame associated with the first image sensor in the non-transitory computer readable storage medium; and
store a second frame associated with the second image sensor in the non-transitory computer readable storage medium.

10. The video controller of claim 9, wherein the instructions to store the first frame comprise instructions to transfer the first frame to the non-transitory computer readable storage medium over a memory bus image.

11. The video controller of claim 1, further comprising the first image sensor and the second image sensor.

12. A non-transitory computer readable storage medium storing a program for execution by a processor, the program including instructions to:
receive a first time of receipt of a first start-of-frame indication associated with a first image sensor;
receive a second time of receipt of a second start-of-frame indication associated with a second image sensor;
calculate a time difference between the first time of receipt associated with the first image sensor and the second time of receipt associated with the second image sensor;
based on the time difference between the first time of receipt and the second time of receipt being greater than or equal to a frame synchronization hysteresis threshold value, adjust a first frame period determining parameter associated with the first image sensor to an adjusted value to decrease the time difference between the first time of receipt associated with the first image sensor and the second time of receipt associated with the second image sensor; and
based on the time difference between the first time of receipt and the second time of receipt being less than the frame synchronization hysteresis threshold value, adjust the first frame period determining parameter to set the first frame period determining parameter for the first image sensor to equal a second frame period determining parameter of the second image sensor.

13. The non-transitory computer readable storage medium of claim 12, wherein the instructions further comprise instructions to adjust the second frame period determining parameter associated with the second image sensor.

14. The non-transitory computer readable storage medium of claim 12, further comprising instructions to adjust a horizontal blanking period of the first image sensor in response to adjusting the first frame period determining parameter of the first image sensor.

15. The non-transitory computer readable storage medium of claim 12, further comprising instructions to adjust a vertical blanking period of the first image sensor in response to adjusting the first frame period determining parameter of the first image sensor.

16. The non-transitory computer readable storage medium of claim 12, wherein the instructions to adjust the first frame period determining parameter comprise instructions to adjust an active data area of the first image sensor.

17. The non-transitory computer readable storage medium of claim 12, wherein the instructions further comprise instructions to:
store a first frame associated with the first image sensor in the non-transitory computer readable storage medium; and
store a second frame associated with the second image sensor in the non-transitory computer readable storage medium.

18. A video controller, comprising:
a start-of-frame monitor configured to:
receive a first start-of-frame indication that has a first time of receipt and is associated with a first image sensor; and
receive a second start-of-frame indication that has a second time of receipt and is associated with a second image sensor;
a frame delta calculator coupled to the start-of-frame monitor, the frame delta calculator configured to calculate a time difference between the first time of receipt and the second time of receipt; and
a frame period adjuster coupled to the frame delta calculator, the frame period adjuster configured to alter a frame period determining parameter associated with at least of the first image sensor or the second image sensor from an original value to:
decrease the time difference between the first time of receipt and the second time of receipt in response to determining that the time difference between the first time of receipt and the second time of receipt is greater than or equal to a frame synchronization hysteresis threshold value; and
set a first frame period determining parameter for the first image sensor to equal a second frame period determining parameter of the second image sensor in response to determining that the time difference between the first time of receipt and the second time of receipt is less than the frame synchronization hysteresis threshold value.

19. The video controller of claim 18, further comprising the first image sensor and the second image sensor.

20. The video controller of claim 18, further comprising instructions to adjust a vertical blanking period of the first image sensor in response to adjusting the first frame period determining parameter of the first image sensor.

* * * * *